April 26, 1932.   W. A. GIBBS   1,855,956
COLLISION DETECTOR AND INDICATOR
Filed June 5, 1930
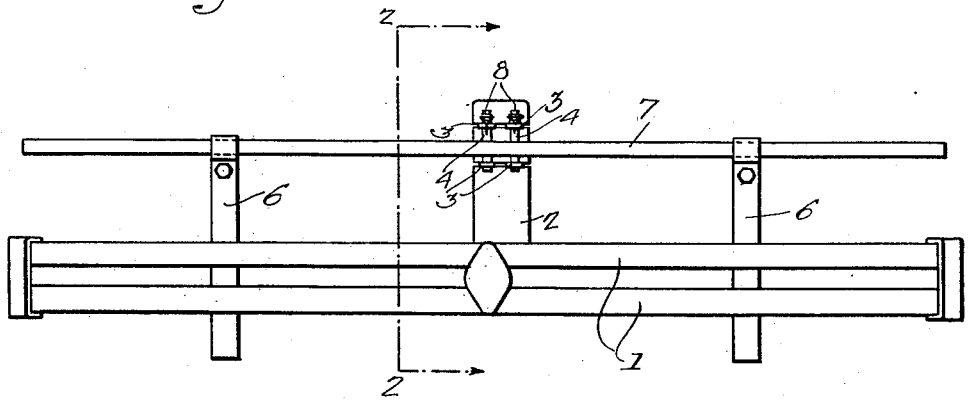
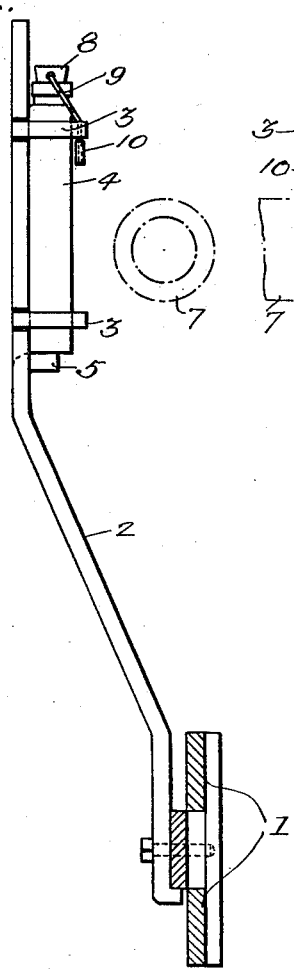
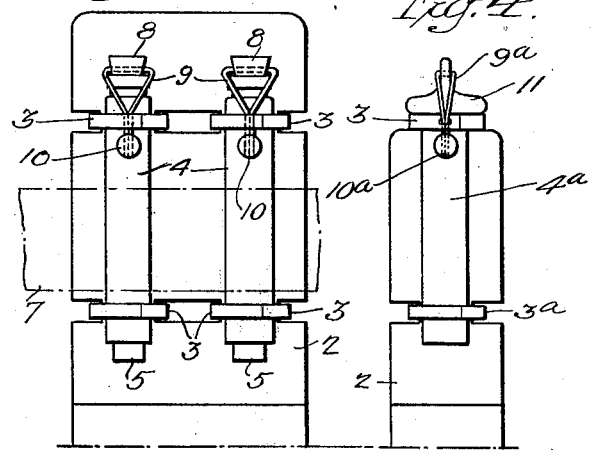
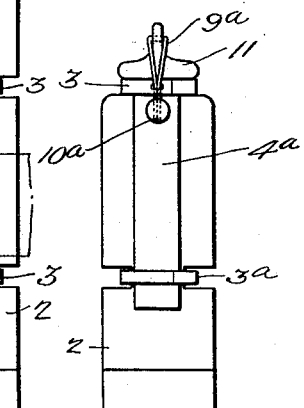
Inventor:
Walter A. Gibbs
by his Attorneys
Howson & Howson Patented Apr. 26, 1932

1,855,956

UNITED STATES PATENT OFFICE

WALTER A. GIBBS, OF HOLLYOAK, DELAWARE

COLLISION DETECTOR AND INDICATOR

Application filed June 5, 1930. Serial No. 459,353.

This invention relates to improvements in devices adapted for use with vehicles to indicate when the vehicle has been involved in a collision and to identify at the point where the collision occurs the participant or participants thereof.

More particularly, the invention relates to improvements in collision indicators of the type, for example, of that disclosed in my co-pending application Serial Number 392,473, filed September 13, 1929, wherein provision is made for distributing a large number of identifying elements at the point or adjacent to the site of the collision. The invention, however, is of value as a means, entirely independent from any other device or devices, for establishing automatically an indication that a collision has occurred at the particular spot where the present device is operative, all as hereinafter set forth.

A principal object of the invention then is to provide means automatically operative to establish a conspicuous signal at the point where a collision has occurred.

Another object of the invention is to provide means of the stated character in which the signal is of a character not readily erasable.

Still another object of the invention is to provide a device of the stated character adapted to afford a signal that is both visible and odorous, or either one of these individually.

A still further object of the invention is to provide a device in which the established signal shall be such as to persist and be effective even under extremely adverse weather conditions.

In a preferred embodiment, the invention contemplates the provision of a collision indicator adapted to distribute more or less widely at the point at which a collision occurs elements of a character accurately identifying the vehicle or vehicles participating in the collision together with a signal conspicuously advertising the fact that the site has been the scene of a collision.

The invention further resides in certain structural details and mechanical features hereinafter set forth, and illustrated in the attached drawings, in which:

Figure 1 is a detached front elevational view of a bumper of a type employed in automotive vehicles;

Fig. 2 is a section on the line 2—2, Fig. 1;

Fig. 3 is a front elevational view of a portion of the apparatus shown in Fig. 2, and Fig. 4 is a fragmentary front elevational view similar to Fig. 3 but showing a modification within the scope of the invention.

With reference to the drawings, 1 indicates a double bar bumper which may be secured to the frame of the motor vehicle in any suitable manner and in accordance with the present practices. Extending upwardly from the bumper 1 is a standard 2 having at the upper end transversely projecting curved arms 3 adapted to embrace and hold one or more frangible receptacles 4, 4, which in the present instance take the form of glass vials. As illustrated in Figs. 2 and 3, the vials, embraced by the arms 3, 3, rest upon lugs 5 projecting from the standard 2. Also suitably secured to the bumper 1 are a pair of upright arms 6, 6 which support a tansverse bar 7, this bar, as shown in Figs. 1 and 2, being arranged forwardly of and in line with the receptacle 4. The arms 6 may be flexible or are pivotally secured to the bumper in such fashion that impact or pressure on the rod 7 will cause this rod to move backwardly and to strike the receptacles 4, which being frangible are broken and thereby release the contents as hereinafter set forth.

As shown in Figs. 2 and 3, each of the vials 4 is provided with a removable closure element 8 in the form of a cork, and this cork is normally secured in the vial by means of a wire 9 which passes through an aperture in the cork and whose ends extend outwardly through a second aperture in the upper arm 3 and are then secured together by means of a suitable seal 10, the arrangement being such that removal of the cork 8 is impossible except by breaking the seal 10 or by severing the wire 9. Also it will be noted that the sealed wire 9 functions to prevent removal of the receptacle as a whole from the retaining arms 3.

In practicing the invention, it is proposed that one of the vials 4 shall contain a liquid, powder or other suitable substance which shall be either colored or shall possess a characteristic odor, or both, the container being both sealed and anchored in position on the supporting structure in the manner set forth above. In the event, therefore, that the vehicle to which this device is attached is involved in a collision, the vial will be ruptured, the contents thereof being discharged onto the road or other surface at the point where the collision occurs. The liquid, or other substances by reason of its pronounced color or odor, or both, immediately establishes a highly conspicuous signal advertising the fact, even in the absence of any other indications, that that spot has been the scene of a collision. By reason of the physical character of the liquid, or other signal medium, it is practically impossible to efface the evidence of the collision, and in the event that snow or dirt obscures or covers the stain, the odor will persist.

This device, used in conjunction with indicating means, such, for example, as that disclosed in my aforenamed copending application, affords a practically inescapable means of detecting and establishing the participants of a collision. Thus in accordance with the aforesaid invention, the second of the vials 4 shown in the drawings may contain a large number of small elements, preferably spherical in form, each of which carries a characteristic mark identifying the particular vehicle to which the device is attached. These spherical identification elements preferably are composed of a material, such as metal, which does not possess any adhesive qualities, so that there is no tendency of the elements to adhere together or to the receptacle when the latter is broken and the contents are discharged onto the ground. Also the shape of the individual elements is preferably such as to further preclude the possibility of cohesion, and the spherical form mentioned above is probably the most satisfactory for this purpose. This spherical form is desirable also by reason of the fact that it affords under ordinary conditions a relatively wide distribution of the elements at the place where they are released, the elements rolling freely in various directions. This widespread distribution is desirable and, in fact, highly essential in order to prevent collection of the identification elements to destroy the evidence.

In practice, the vial containing the identification elements will be ruptured simultaneously with the rupture of the vial containing the liquid previously described, so that the contents of both vials are released and projected onto the underlying ground surface. In the event now that the vehicles are removed from the scene, there remains both the conspicuous mark and the odor made by the said liquid and the multiplicity of identification elements. An examination of the area results in the location of one or more of the identification elements, with the result that the participant or participants of the accident are readily identified. It is apparent that both the signaling medium and the identification elements may be carried in a single container instead of the separate containers illustrated.

It will be understood that the means for identifying the particular vehicle involved in the collision may vary widely, and is not limited to the particular form of device herein described for the purpose of illustrating the invention.

In Fig. 4, I have illustrated a modification within the scope of the invention. In this instance, the receptacle 4a, instead of taking the form of a stoppered vial, is closed by means integral with the receptacle. Where the receptacle for example is made of glass, the open end, after the identifying medium is inserted, may be closed and sealed by fusing and drawing the glass over the open end. In the present instance, the receptacle is provided with an integral enlarged head 11, which rests upon the upper clamp 3 and thereby supports the receptacle 4a in the encircling retaining arm. The upper end of the integral closure cap 11 is provided with an aperture for the retaining wire 9a which is passed through an aperture in the upper retaining arm 3 and is secured by means of a seal 10a which binds the ends of the wire 9a together and prevents retraction through the opening in the arm 3. In this instance following rupture in accident, the entire vial must be replaced by a duly constituted officer.

I claim:

1. A collision indicator for vehicles comprising a sealed frangible container carrying a conspicuously colored substantially indelible accident-denoting substance, and collision-actuated means for rupturing said container to release said substance.

2. A collision indicator for vehicles comprising a sealed frangible container carrying an odorous substance, and collision-actuated means for rupturing said container to release said substance.

3. A collision indicator for vehicles comprising sealed frangible-containing means for a multiplicity of identification elements adapted for distribution at the site of the accident involving said vehicle, and a conspicuously colored substantially indelible accident-denoting substance and collision-actuated means for rupturing said containing means to release the identification elements and said substance.

4. A collision indicator for vehicles comprising sealed frangible-containing means for a multiplicity of identification elements adapted for distribution at the site of the accident involving said vehicle and for an odorous substance, and collision-actuated means for rupturing said containing means to release the identification elements and said substance.

WALTER A. GIBBS.